United States Patent [19]
Okazaki et al.

[11] Patent Number: 5,016,347
[45] Date of Patent: May 21, 1991

[54] METHOD AND APPARATUS OF MAKING TERMINALS OF CABLES

[75] Inventors: Takashi Okazaki; Eiji Suzuki, both of Toyonakashi; Takashi Shinohara, Takarazukashi, all of Japan

[73] Assignee: Nippon Acchakutanshi Seizo Kabushiki Kaisha, Osaka, Japan

[21] Appl. No.: 503,955

[22] Filed: Apr. 4, 1990

[30] Foreign Application Priority Data

Apr. 19, 1989 [JP] Japan .................. 1-99596

[51] Int. Cl.⁵ .................. H01R 43/00; B23P 23/00
[52] U.S. Cl. .................. 29/825; 29/564.4; 29/33 M; 29/755; 29/828
[58] Field of Search .................. 29/825, 828, 564.4, 29/749, 33 M, 857, 755; 174/117 F; 81/9.51

[56] References Cited

U.S. PATENT DOCUMENTS

| | | | |
|---|---|---|---|
| 2,956,717 | 10/1960 | Scharf | 81/9.51 X |
| 3,309,948 | 3/1967 | Falken | 81/9.51 |
| 3,741,261 | 6/1973 | Windsor et al. | 29/564.4 X |
| 3,832,767 | 9/1974 | Petree | 29/564.4 X |
| 3,895,426 | 7/1975 | Papsdorf | 29/564.4 X |
| 4,009,738 | 3/1977 | Baba et al. | 81/9.51 X |
| 4,091,695 | 5/1978 | Funcik et al. | 81/9.51 |
| 4,275,619 | 6/1981 | Shimizu | 81/9.51 |
| 4,584,912 | 4/1986 | Gudmestad et al. | 81/9.51 |
| 4,932,710 | 6/1990 | Tanaka | 29/749 X |

Primary Examiner—Carl J. Arbes
Attorney, Agent, or Firm—Antonelli, Terry, Stout & Kraus

[57] ABSTRACT

The treatment of terminals of cables in producing electrical harnesses is effected by cutting a shield ribbon cable into two portions, making shallow cuts on the sheath of each portion, pulling the two cable portions in opposite directions so as to separate their sheath portions from the respective cuts with the uncovered terminals of the cable portions remaining in the sheath portions, and cutting the uncovered terminals outside the respective sheath portions so as to align the cut ends thereof.

8 Claims, 5 Drawing Sheets

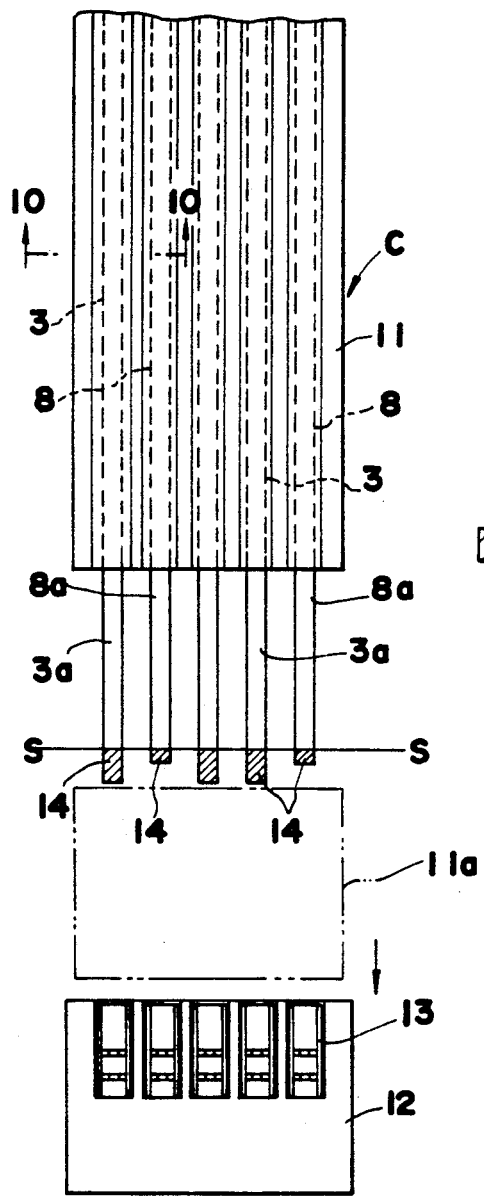
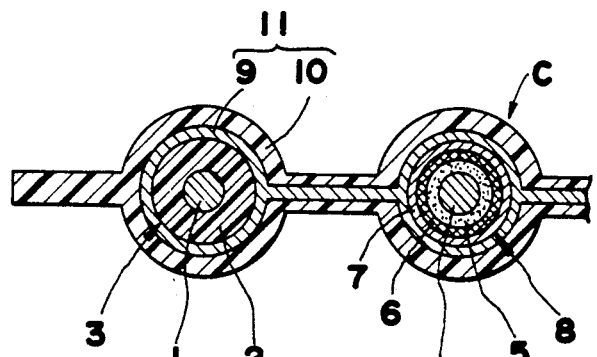

METHOD AND APPARATUS OF MAKING TERMINALS OF CABLES

BACKGROUND OF THE INVENTION

1. Field of the Invention

The present invention relates generally to the treatment of shield ribbon cables in an apparatus and method for connecting shield ribbon cables to contact-type connectors so as to produce electrical harnesses. Hereinafter the shield ribbon cable will be referred to merely as the "shield cable".

2. Description of the Prior Art

To explain the background of the invention, reference will be made to FIGS. 9 and 10. The illustrated embodiment is a typical known shield cable C which comprises a signal transmission cable 3 having a core cable 1 clad in an insulating covering 2, and ground wires 8 having a core line 4 clad in a carbon fiber 5 covered with metal wires 6 of a mesh or a winding. The signal transmission cable 3 and the ground wires 8 are mutually arranged in parallel at equal intervals and wrapped in an electrically conducting foil 9, which is covered with an outermost insulating layer 10. The covering foil 9 and the insulating layer 10 constitute a sheath 11.

When the shield cables C of such structure is individually connected to contacts 13 of a contact-type connector 12 so as to fabricate an electrical harness by an automatic contact-connecting apparatus, the shield cables (C) are cut to a predetermined length, and sheath portions 11a (indicated by an imaginary line in FIG. 9) are removed, thereby connecting uncovered terminals 3a and 8a to the contacts 13 of the contact-type connector 12. This method has the following disadvantage:

Since the insulating covering 2 of the signal transmission cable 3 is made of flexible plastics, such as polyvinyl chloride, polyethylene, cross-linked polyethylene and foam polyethylene, it is lengthened when the sheath portion 11a is pulled. As a result, the lengths of the uncovered terminals 3a and 8a become uneven as shown in FIG. 9. To equalize the lengths of the uncovered terminals, the terminals 3a and 8a are cut along a line S—S. The cutting of cables produces scraps 14. The scraps 14 are small pieces and easily enter in between the cutting blades, stripping blades and/or moving parts of the apparatus. Once the scraps 14 stay in these parts, they are difficult to remove, and what is worse, they tend to cause malfunction in operating the apparatus.

SUMMARY OF THE INVENTION

Accordingly, an object of the present invention is to provide a device for cutting shield cables without scattering scraps.

Another object of the present invention is to provide a method for cutting shield cables without producing scattered scraps.

According to the present invention there is provided a method for treating terminals of cables in producing electrical harnesses, the method comprising the steps of cutting a shield cable into two portions, making shallow cuts in each sheath portion, pulling the two cable portions in opposite directions while the sheath portions are retained so as to separate their sheath portions from the respective cuts so that the tip ends of the uncovered terminals of the cable portions remain in the sheath portions, and cutting the uncovered terminals outside the respective sheath portions so as to align the cut ends thereof.

According to another aspect of the invention, there is provided a device for treating terminals of cables in producing electrical harnesses, the device comprising a pair of first cutting blades for cutting the cable into two portions, the cutting blades being situated at opposite sides of a feed path along which a treating cable is fed; two pairs of stripping blades for making cuts on the sheaths of the respective cable portions, the stripping blades in each pair being situated at opposite sides of the feed path, the pairs being spaced at a predetermined interval with the first cutting blades interlocated therebetween; a pair of chucks for pulling the respective cable portions in opposite directions so as to uncover the terminals of the cable portions from the cuts; and a pair of second cutting blades for cutting the uncovered terminals outside the respective sheath portions so as to align the cut ends, the second cutting blades being cooperable with the upper stripping blades in each pair.

In a preferred embodiment the device further comprises two pairs of pressing dies and punches spaced from the second cutting blades in the direction in which the cut cable portions are pulled by the chucks, each pair of pressing dies and punch being movable toward each other so that they cooperate to press the uncovered terminals of the cable portions.

In a further preferred embodiment the pressing dies are situated at opposite sides with respect to the feed path of the cable.

Thus, scraps resulting from cutting ends of cables are prevented from scattering and are collected in sheath portions separated from the respective sheathes. The scraps contained in the sheath portions, which per se are wastes, can be discarded without being entangled in the cutting blades, stripping blades and other moving parts of the apparatus.

BRIEF DESCRIPTION OF THE DRAWINGS

FIG. 9 is a schematic plan view showing a known method of stripping the shield cable of its insulating covering; and FIG. 10 is a cross-sectional view taken along the line 10—10 in FIG. 10.

DETAILED DESCRIPTION OF THE PREFERRED INVENTION

Figure 1:
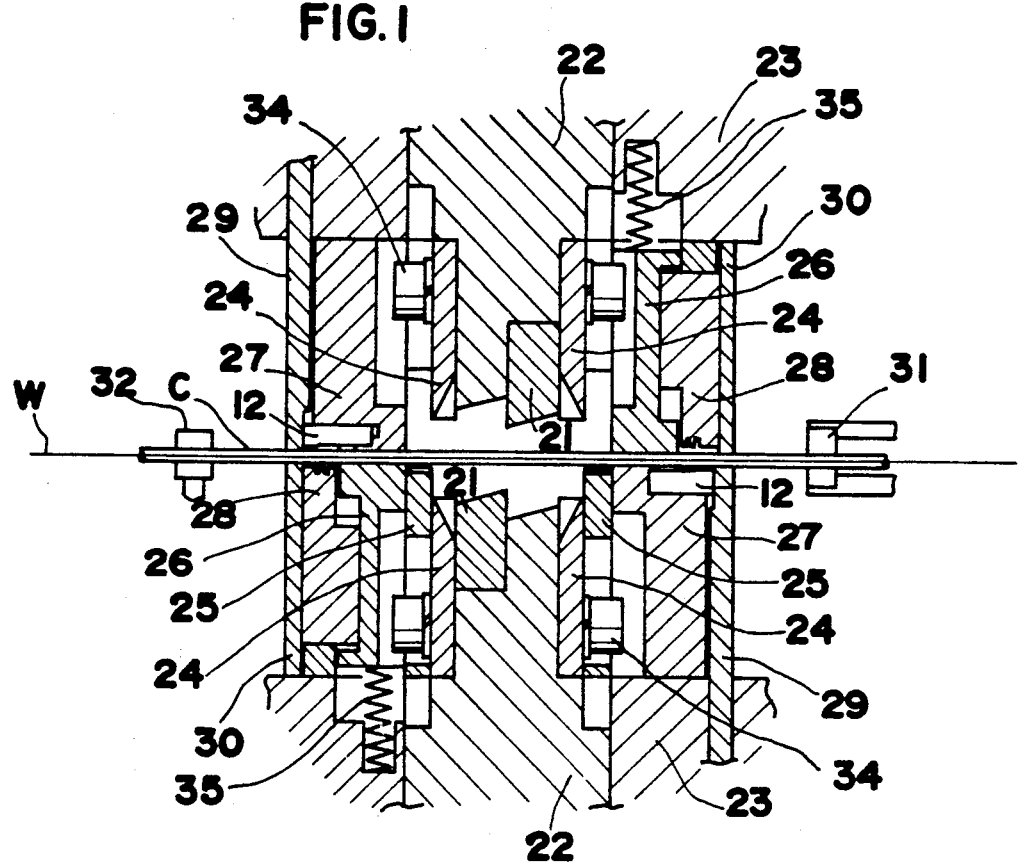
FIG. 1 is a cross-sectional view showing a main portion of a contact-connecting apparatus incorporating a cutting device according to the present invention.
Figure 2:
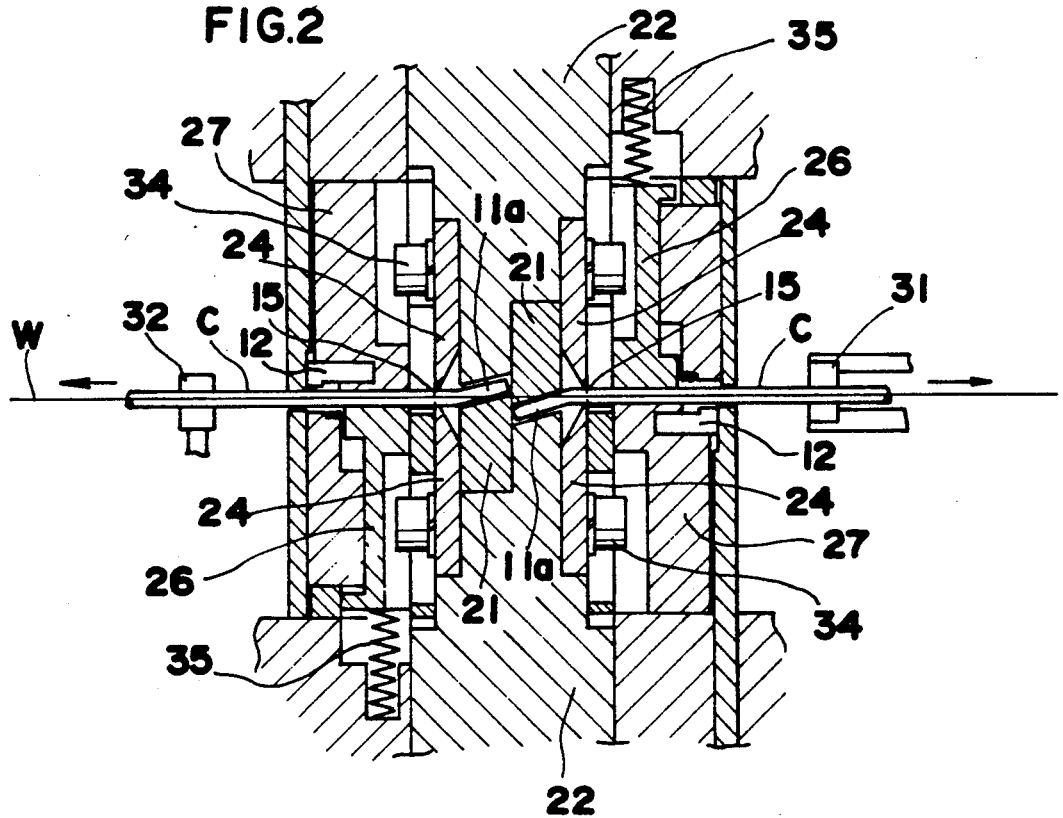
FIGS. 2 to 6 are cross-sectional views showing a series of operations performed by the apparatus of FIG. 1.

Referring to FIG. 1, which shows an automatic contact-connecting apparatus incorporating a device of cutting a shield cable. A treating shield cable C has the same structure as that of the known shield cable shown in FIGS. 9 and 10, and is supplied along a feed path W.

A pair of cutting blades 21 are disposed adjacent to the feed path W, with each pair of cutting blades 21 being mounted on respective holders 22 which mutually move toward and from each other by a pneumatic cylinder (not shown).

In addition, two pairs of stripping blades 24 are secured to the side walls of the respective holders 22 by means of fastening screws 34. The pairs of stripping blades 24 are spaced from each other at a distance corresponding to a length of the sheath 11 to be stripped, with the cutting blades 21 being interlocated therebetween.

There are provided second cutting blades 25 which cut the terminals of the stripped cable. The second cutting blades 25 are disposed adjacent to the outside of the lower stripping blades 24, and are operated in association with the upper stripping blades 24. The second cutting blades 25 are secured to a lower guide 23. Retainers 26 are urged toward the pressing dies 27 by springs 35 for retaining the cable C being cut by the cutting blades in position by cooperating with the pressing dies 27 in a manner described more fully hereinbelow.

The pressing dies 27 mate with pressing punches 28. In the illustrated embodiment two pairs of dies 27 and punches 28 are disposed in opposition to each other with the feed path W interlocated therebetween. One of the dies 27 is located above the feed path W and the other is located below it. This arrangement enables the fabrication of a "reversed harness" which is provided with cables having oppositely facing connectors at oppositely terminals thereof.

The dies 27 and the punches 28 ascend to a pressing position by moving the guides 23 by a pneumatic cylinder (not shown) so as to press the cable.

The reference numerals 29 and 30 denote pressers for pressing the cable being stripped of the insulating covering. The cable C is maintained and moved by chucks 31 and 32 when the cable C is stripped of the insulating covering to uncover terminals 3a and 8a.

Figure 7:
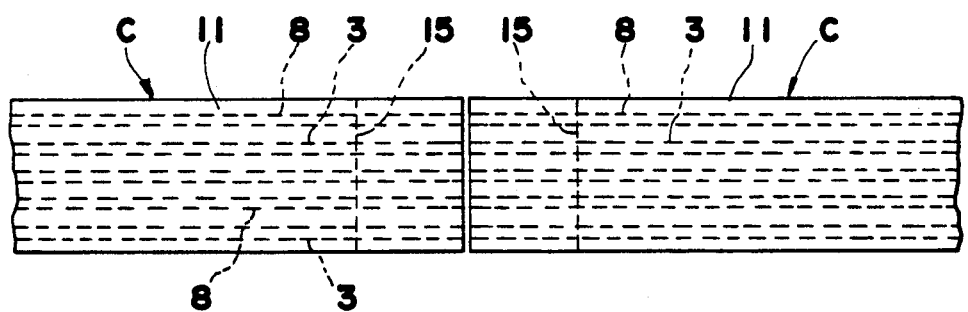
FIG. 7 is a schematic plan view showing a shield cable being cut by stripping blades.

The contact-connecting apparatus is operated as follows:

The cable C is maintained at a predetermined position as shown in FIG. 1. The upper and lower holders 22 are moved toward each other until the cutting blades 21 cut the cable C into two cable portions, and the stripping blades 24 make shallow cuts 15 in the sheath 11 of each cable portion (FIG. 7).

Figure 3:
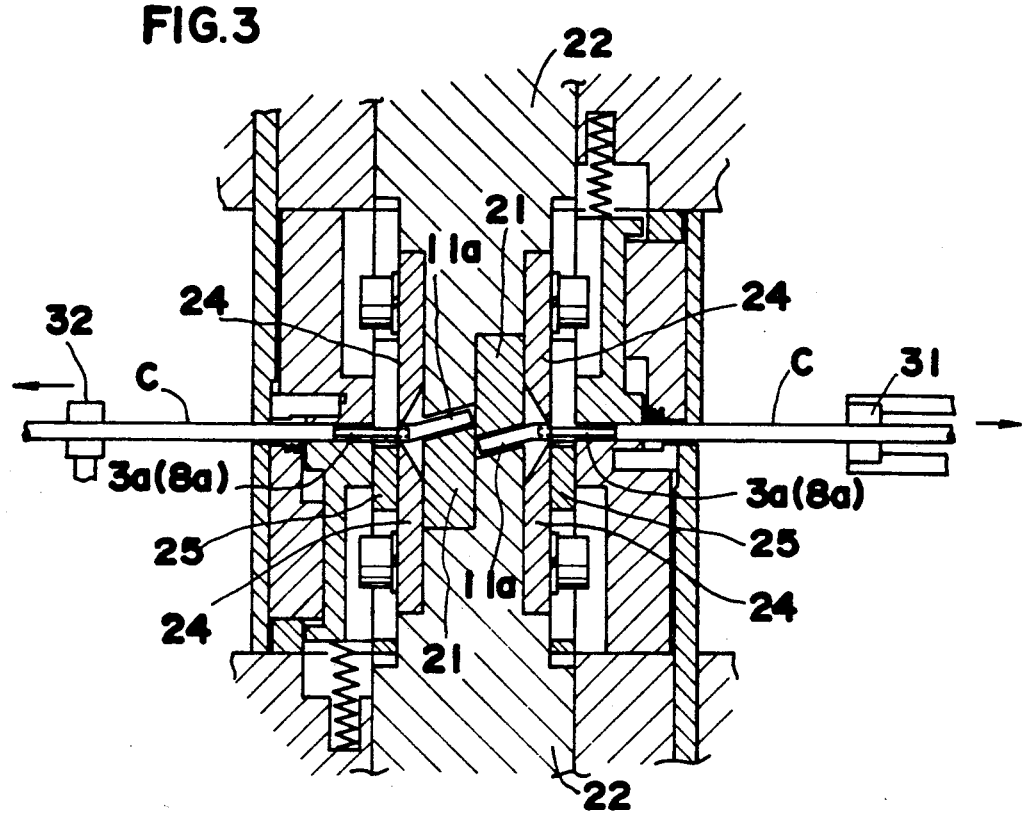
Figure 4:
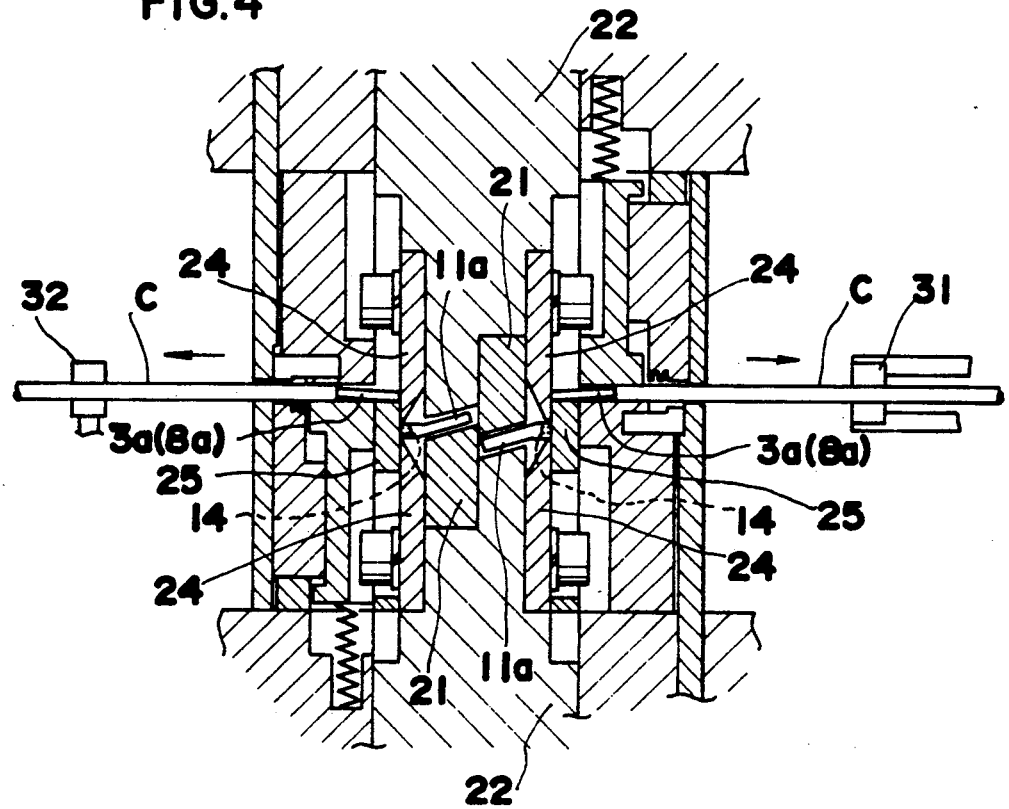
Figure 8:
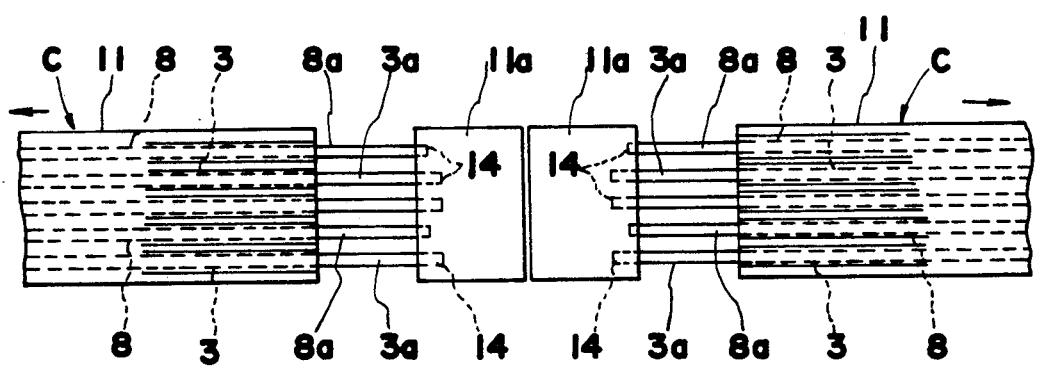
FIG. 8 is a schematic plan view showing the shield cable of FIG. 7 being stripped of the shield portions by the stripping blades.

Then the chucks 31 and 32 are moved in opposite directions over such a distance as to enable the cut ends of the cable C to become separated from each other as shown in FIG. 3. In this way sheath portions 11a of the sheath are stripped until the terminals 3a and 8a are uncovered. At this stage the chucks 31 and 32 are moved in the direction of arrow in FIG. 8 until the tip ends of the uncovered terminals 3a and 8a remain in the sheath portions 11a as shown in FIG. 8.

Then, the holders 22 are simultaneously lowered, in the course of which the upper stripping blades 24 and the second cutting blades 25 cooperatively cut the terminals 3a and 8a at positions adjacent to the respective sheath portions 11a so that the tip ends are aligned. Scraps 14 remain in the sheath portions 11a separated from the respective sheaths 11, and discarded together therewith without scattering.

Figure 5:
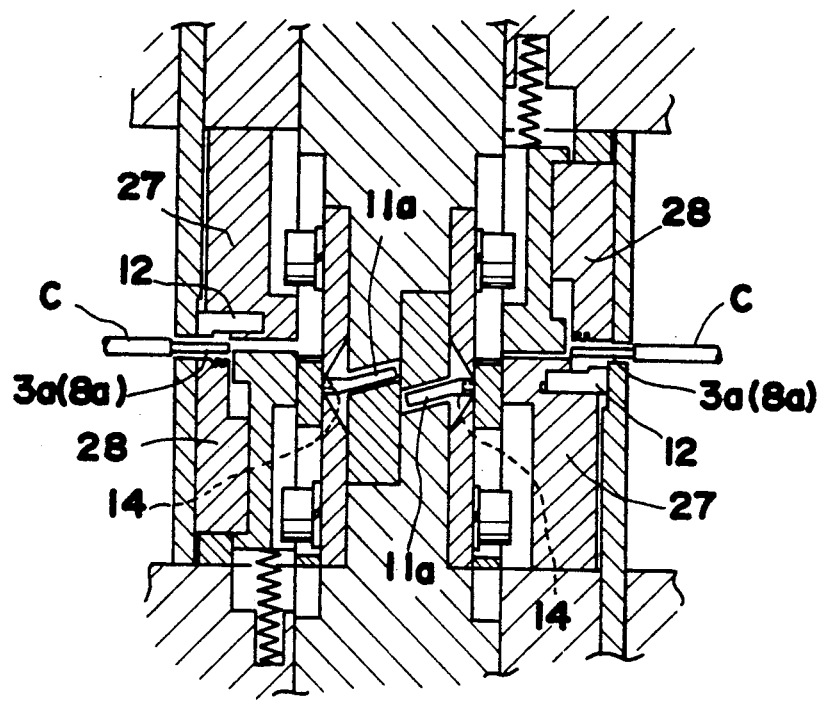
Figure 6:
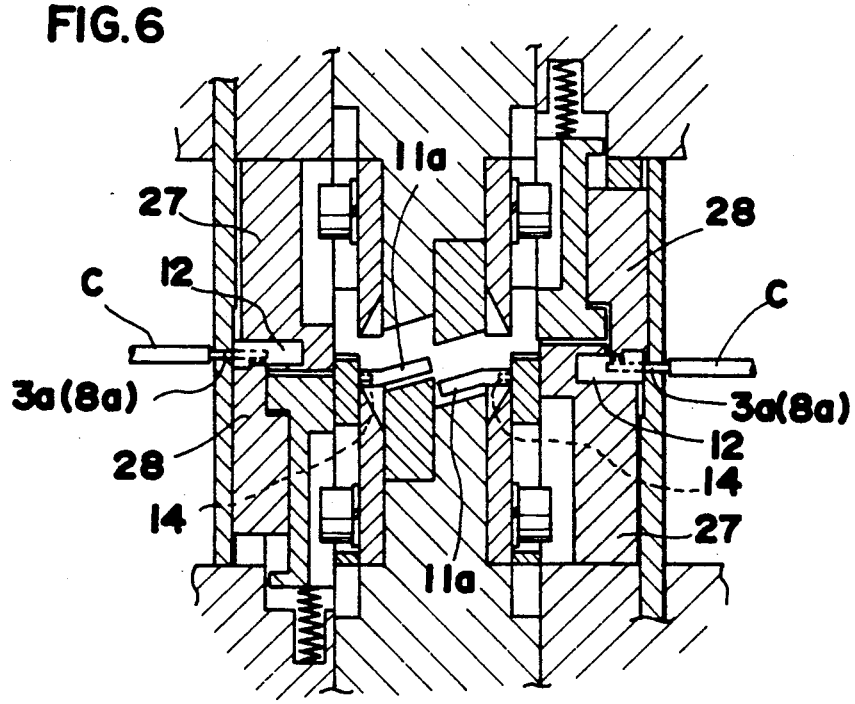

Then, as shown in FIG. 5, the cable C is advanced by the chucks 31 and 32 until the aligned terminals 3a and 8a are positioned at a place where the contact connection is effected. Then, the pressing dies 27 and punches 28 are moved toward each other, and the punches 28 press the terminals 3a and 8a to fit in contacts 13 of the connectors 12 (FIG. 9) maintained by the dies 27. As shown in FIG. 6, the connectors 12 at the left-hand and right-hand terminals of 3a and 8a of the respective cables C face in opposite directions. From this it is possible to feed the left-hand cable C to the right by a desired length, and connect a connector 12 to its opposite terminals 3a and 8a in the aforementioned manner. In this way "reverse harnesses" can be produced which are provided with oppositely facing connectors 12 at opposite ends. The production of the "reverse harnesses" results from an arrangement in which, as shown in FIG. 5, one pair of pressing dies and punches are placed oppositely to the other pair. If the two pairs are arranged in the same posture, the resulting harnesses are a regular type which has connectors 12 facing in the same direction.

According to the present invention, scraps resulting from cutting cable ends are prevented from scattering but collected in the sheath portions separated from the respective sheathes. The scraps contained in the sheath portions, which per se are wastes, can be discarded without the risk of being entangled in the cutting blades, stripping blades and other moving parts of the apparatus.

What is claimed is:

1. A method for treating terminals of a shield cable in producing electrical harnesses, the method comprising the steps of:

cutting the shield cable into two cable portions each including a sheath portion;

making shallow cuts in each sheath portion of the two cable portions;

pulling the two cable portions in opposite directions while the respective sheath portions are retained so as to separate the sheath portions from the respective cuts so that tip ends of uncovered terminals of the cable portions remain in the sheath portions; and cutting the uncovered terminals outside the respective sheath portions so as to align the cut ends thereof.

2. A device for treating terminals of a shield cable in producing electrical harnesses, the device comprising:

a pair of first cutting blades for cutting the cable into two cable portions, the cutting blades being situated at opposite sides of a feed path along which the shield cable is fed;

two pairs of stripping blades for making shallow cuts on a sheath portion of the respective cable portions, the stripping blades in each pair being situated at opposite sides of the feed path, the pairs of stripping blades being spaced at a predetermined interval with the first cutting blades being interlocated therebetween;

a pair of chucks for pulling the respective cable portions in opposite directions so as to uncover terminals of the cable portions from the cuts; and a pair of second cutting blades for cutting terminals outside the respective sheath portions so as to align the cut ends, the cutting blades being cooperable with the upper stripping blades in each pair.

3. A device according to claim 2, further comprising two pairs of pressing dies and punches spaced from the second cutting blades in the direction in which the cable portions are pulled by the chucks, each pair of pressing dies and punches being movable toward each other so that they cooperate to press the terminals of the cable portions.

4. A device according to claim 3, wherein the pressing dies are situated at opposite sides with respect to the feed path of shield cable.

5. A method for treating terminals of a shield ribbon cable in producing electrical harnesses, the shield ribbon cable each comprising a flat sheath which covers signal transmission cables and ground wires disposed at regular intervals in parallel with each other within the sheath, each of said transmission cables and ground wires comprising one of a core cable and core line covered with one of an insulating and conducting covering, the method comprising the steps of:
    cutting the shield ribbon cable into two cable portions each covered with a sheath portion;
    making shallow cuts on each sheath portion, said shallow cuts having a depth insufficient to penetrate uncovered terminals;
    pulling the two cable portions in opposite directions while retaining the sheath portions of a predetermined length so as to be separated along the respective shallow cuts whereby tip ends of the uncovered terminals remain within the separated sheath portions; and
    cutting tip ends outside and adjacent to the respective separated sheath portions so as to align the cut ends of the uncovered terminals, whereby the tip ends within the separated sheath portions are discarded as scraps with said separated sheath portions.

6. A device for treating terminals of a shield ribbon cable in producing electrical harnesses, the shield ribbon cable each comprising a flat sheath for covering signal transmission cables and ground wires that are disposed at regular intervals in parallel with each other within the sheath, each of said transmission cables and ground wires including one of a core cable and core line covered with one of an insulating and conducting covering, the device comprising:
    a pair of first cutting blades for cutting the shield ribbon cable into two cable portions each covered with a sheath portion of a predetermined length, the cutting blades being located at opposite sides of a feed path along which the shield ribbon cable is fed;
    two pairs of upper and lower stripping blades for making shallow cuts on the sheath portions of the respective cable portions, the stripping blades in each pair being located at opposite sides of the feed path and being spaced from each other by a distance such that the shallow cuts penetrate only the sheath portions, said pairs of upper and lower stripping blades being spaced at a predetermined interval with the first cutting blades being interposed therebetween;
    a pair of chucks for pulling the respective cable portions in opposite directions so as to uncover the terminals of the cable portions and to separate sheath portions from the shallow cuts so that tip ends of uncovered terminals remain within the separated sheath portions; and
    a pair of second cutting blades for cutting ends of the uncovered terminals outside and adjacent to the respective separated sheath portions so as to align the cut ends, the second cutting blades respectively being cooperable with the upper stripping blades, whereby the tip ends with the separated sheath portions are discarded as scraps together with said separated sheath portions.

7. A device according to claim 6, further comprising two pairs of pressing dies and punches spaced from the second cutting blades in a direction in which the cable portions are pulled by the chucks, wherein the pressing die and punch in each pair are movable toward each other so as to cooperate to press the uncovered terminals respectively into contact with connectors.

8. A device according to claim 7, wherein the pressing dies are located such that one pressing die is disposed above the feed path and the other pressing die is disposed below the fed path.

* * * * *